(12) United States Patent
Nelson et al.

(10) Patent No.: US 11,107,353 B2
(45) Date of Patent: Aug. 31, 2021

(54) SYSTEM FOR COMMUNICABLE INTEGRATION OF AN AUTOMOBILE SYSTEM AND A FUEL STATION SYSTEM

(71) Applicant: BANK OF AMERICA CORPORATION, Charlotte, NC (US)

(72) Inventors: Mark Allan Nelson, Waxhaw, NC (US); Karen Lea MacQueen, Lyndhurst, OH (US); Stephen Philip Selfridge, Huntersville, NC (US); Ashish B. Tajpuria, San Francisco, CA (US); Tony England, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 182 days.

(21) Appl. No.: 15/910,179

(22) Filed: Mar. 2, 2018

(65) Prior Publication Data
US 2019/0156328 A1 May 23, 2019

Related U.S. Application Data

(60) Provisional application No. 62/589,953, filed on Nov. 22, 2017.

(51) Int. Cl.
*G06Q 40/00* (2012.01)
*G08G 1/14* (2006.01)
(Continued)

(52) U.S. Cl.
CPC ......... *G08G 1/144* (2013.01); *G01C 21/3469* (2013.01); *G01C 21/3484* (2013.01);
(Continued)

(58) Field of Classification Search
CPC .............................. G08G 1/144; G06Q 40/00
(Continued)

(56) References Cited

U.S. PATENT DOCUMENTS

| 5,805,807 A | 9/1998 | Hanson et al. |
|---|---|---|
| 6,526,335 B1 | 2/2003 | Treyz et al. |

(Continued)

FOREIGN PATENT DOCUMENTS

| CA | 2839208 A1 | 7/2014 |
|---|---|---|
| CA | 2820432 A1 | 12/2014 |

(Continued)

OTHER PUBLICATIONS http://www.techradar.com/news/meet-the-car-key-thats-also-a-contactless-payment-card Retrieved on May 30, 2018.
(Continued)

*Primary Examiner* — Kirsten S Apple
(74) *Attorney, Agent, or Firm* — Michael A. Springs; Moore & Van Allen PLLC; Nicholas C. Russell

(57) ABSTRACT

Embodiments of the present invention provide a system for transferring one or more resources associated with an interaction via an automobile. The system is typically configured for receiving an input from a user, via one or components of an automobile, to identify one or more third party entities associated with an interaction, identifying, via the one or more components, a current location and a destination of the user, identifying the one or more third party entities between the current location and the destination, applying logic to select a third party entity from the one or more third party entities, establishing a communication link with a third party entity device associated with the third party entity, and initiating transfer of resources to the remote device to complete the interaction.

20 Claims, 9 Drawing Sheets

(51) Int. Cl.

| | |
|---|---|
| *H04W 4/02* | (2018.01) |
| *G01C 21/36* | (2006.01) |
| *H04L 29/08* | (2006.01) |
| *H04M 1/72457* | (2021.01) |
| *G05D 23/19* | (2006.01) |
| *H04W 64/00* | (2009.01) |
| *H04W 76/10* | (2018.01) |
| *H04M 1/60* | (2006.01) |
| *H04W 72/04* | (2009.01) |
| *G06F 16/9537* | (2019.01) |
| *G06F 16/29* | (2019.01) |
| *G06Q 10/08* | (2012.01) |
| *G06Q 30/06* | (2012.01) |
| *G01C 21/34* | (2006.01) |
| *G06Q 20/34* | (2012.01) |
| *G07B 15/06* | (2011.01) |
| *G07B 15/02* | (2011.01) |
| *G01S 19/51* | (2010.01) |

(52) U.S. Cl.
CPC ..... *G01C 21/3492* (2013.01); *G01C 21/3617* (2013.01); *G05D 23/1917* (2013.01); *G06F 16/29* (2019.01); *G06F 16/9537* (2019.01); *G06Q 10/0834* (2013.01); *G06Q 20/34* (2013.01); *G06Q 30/0611* (2013.01); *G06Q 30/0613* (2013.01); *G06Q 30/0635* (2013.01); *G07B 15/063* (2013.01); *G08G 1/148* (2013.01); *H04L 67/12* (2013.01); *H04L 67/125* (2013.01); *H04L 67/18* (2013.01); *H04L 67/20* (2013.01); *H04L 67/22* (2013.01); *H04M 1/6091* (2013.01); *H04M 1/72457* (2021.01); *H04W 4/02* (2013.01); *H04W 64/006* (2013.01); *H04W 72/04* (2013.01); *H04W 76/10* (2018.02); *G01C 21/3461* (2013.01); *G01C 21/3685* (2013.01); *G01S 19/51* (2013.01); *G06Q 2240/00* (2013.01); *G07B 15/02* (2013.01); *G08G 1/143* (2013.01); *H04L 29/08* (2013.01)

(58) Field of Classification Search
USPC .......................................................... 705/35
See application file for complete search history.

(56) References Cited

U.S. PATENT DOCUMENTS

| | | | |
|---|---|---|---|
| 7,520,440 | B2 | 4/2009 | Ortigosa Vallejo et al. |
| 7,742,941 | B2 | 6/2010 | Yamauchi |
| 8,170,960 | B1 | 5/2012 | Bill |
| 8,751,391 | B2 | 6/2014 | Freund |
| 9,292,832 | B2 | 3/2016 | Goel et al. |
| 9,413,827 | B2 | 8/2016 | Sharma et al. |
| 9,438,440 | B2 | 9/2016 | Burns et al. |
| 9,471,915 | B2 | 10/2016 | Fuerstenberg et al. |
| 9,496,736 | B1 * | 11/2016 | Johansson ............ H02J 7/0054 |
| 9,508,068 | B2 | 11/2016 | Mastrangelo et al. |
| 9,541,912 | B1 | 1/2017 | Grossman, IV et al. |
| 9,680,726 | B2 | 6/2017 | Sharma et al. |
| 9,717,012 | B2 | 7/2017 | Zakaria et al. |
| 9,742,740 | B2 | 8/2017 | Fransen |
| 9,774,497 | B2 | 9/2017 | Britt et al. |
| 9,774,507 | B2 | 9/2017 | Britt et al. |
| 9,801,000 | B2 | 10/2017 | Shao |
| 9,847,961 | B2 | 12/2017 | Shuman et al. |
| 9,900,171 | B2 | 2/2018 | Guedalia et al. |
| 9,900,172 | B2 | 2/2018 | Goel et al. |
| 10,121,289 | B1 | 11/2018 | Gravelle |
| 2003/0061109 | A1 | 3/2003 | Banerjee et al. |
| 2004/0177008 | A1 | 9/2004 | Yang |
| 2006/0161340 | A1 | 7/2006 | Lee |
| 2007/0088624 | A1 | 4/2007 | Vaughn et al. |
| 2008/0102686 | A1 | 5/2008 | Carreras Garcia et al. |
| 2008/0291054 | A1 | 11/2008 | Groft |
| 2008/0313052 | A1 | 12/2008 | Otto et al. |
| 2010/0161149 | A1 | 6/2010 | Nguyen et al. |
| 2012/0271758 | A1 * | 10/2012 | Jammer ................ B60L 53/305 705/39 |
| 2013/0073094 | A1 | 3/2013 | Knapton et al. |
| 2013/0138515 | A1 | 5/2013 | Taniguchi et al. |
| 2013/0226651 | A1 | 8/2013 | Napper |
| 2013/0282472 | A1 * | 10/2013 | Penilla ................ B60L 53/305 705/14.35 |
| 2014/0207281 | A1 | 7/2014 | Angle et al. |
| 2014/0279081 | A1 | 9/2014 | Marx et al. |
| 2014/0279208 | A1 | 9/2014 | Nickitas et al. |
| 2014/0279596 | A1 | 9/2014 | Waris |
| 2015/0088617 | A1 | 3/2015 | Geist et al. |
| 2015/0106204 | A1 | 4/2015 | Pudar |
| 2015/0269521 | A1 | 9/2015 | Knapp et al. |
| 2015/0298565 | A1 * | 10/2015 | Iwamura ................ B60L 3/00 701/22 |
| 2015/0309484 | A1 | 10/2015 | Lyman |
| 2015/0338116 | A1 | 11/2015 | Furuta et al. |
| 2015/0358777 | A1 | 12/2015 | Gupta |
| 2016/0012726 | A1 | 1/2016 | Wang |
| 2016/0094883 | A1 | 3/2016 | Tidwell et al. |
| 2016/0162833 | A1 | 6/2016 | Garden |
| 2016/0197769 | A1 | 7/2016 | Britt et al. |
| 2016/0197772 | A1 | 7/2016 | Britt et al. |
| 2016/0197786 | A1 | 7/2016 | Britt et al. |
| 2016/0216123 | A1 | 7/2016 | Liao et al. |
| 2016/0244311 | A1 | 8/2016 | Burks et al. |
| 2017/0098376 | A1 | 4/2017 | Wang |
| 2017/0108348 | A1 | 4/2017 | Hansen et al. |
| 2017/0118307 | A1 | 4/2017 | Beaurepaire et al. |
| 2017/0127230 | A1 | 5/2017 | Enriquez et al. |
| 2017/0290345 | A1 | 10/2017 | Garden et al. |
| 2017/0359343 | A1 | 12/2017 | Sterl et al. |
| 2017/0365030 | A1 | 12/2017 | Shoham et al. |
| 2017/0372294 | A1 | 12/2017 | Pelletier |
| 2018/0012224 | A1 | 1/2018 | Ricci |
| 2018/0025348 | A1 | 1/2018 | Shauh et al. |
| 2018/0025551 | A1 | 1/2018 | Centner |
| 2018/0039993 | A1 | 2/2018 | Rossi et al. |
| 2018/0053140 | A1 | 2/2018 | Baca et al. |
| 2018/0089917 | A1 | 3/2018 | Obaidi |
| 2018/0190126 | A1 | 7/2018 | Teslenko et al. |
| 2018/0315313 | A1 | 11/2018 | Klochikhin et al. |
| 2018/0320908 | A1 | 11/2018 | Lorenz et al. |
| 2018/0357900 | A1 | 12/2018 | Wang |
| 2019/0050951 | A1 | 2/2019 | Goldberg et al. |
| 2019/0243842 | A1 | 8/2019 | Li et al. |
| 2019/0244172 | A1 | 8/2019 | Carrier et al. |
| 2019/0287063 | A1 | 9/2019 | Skaaksrud et al. |
| 2019/0287066 | A1 | 9/2019 | Kellaway, Jr. et al. |
| 2019/0360823 | A1 | 11/2019 | Nelson et al. |
| 2020/0175429 | A1 | 6/2020 | Beaurepaire et al. |

FOREIGN PATENT DOCUMENTS

| | | |
|---|---|---|
| DE | 10316106 A1 | 10/2004 |
| JP | 2005309977 A | 11/2005 |
| JP | 2007202051 A | 8/2007 |
| JP | 2012189427 A | 10/2012 |
| JP | 2013200098 A | 10/2013 |
| JP | 2017027418 A | 2/2017 |
| KR | 20150020171 A | 2/2015 |
| WO | 2014015977 A2 | 1/2014 |
| WO | 2017177041 A2 | 10/2017 |
| WO | 2019014020 A1 | 1/2019 |

OTHER PUBLICATIONS https://usa.visa.com/visa-everywhere/innovation/visa-connected-car.html Retrieved on May 30, 2018.

http://lisnr.com/resources/blog/in-car-contactless-payments-the-next-generation-of-mobile-commerce/ Retrieved on May 30, 2018.

(56) References Cited

OTHER PUBLICATIONS http://www.autoconnectedcar.com/2018/02/paybycar-e-zpass-transponder-in-car-payments-for-gas-food-services/ Retrieved on May 30, 2018.

* cited by examiner

SYSTEM FOR COMMUNICABLE INTEGRATION OF AN AUTOMOBILE SYSTEM AND A FUEL STATION SYSTEM

CROSS-REFERENCE OF RELATED APPLICATIONS

This application claims priority to U.S. Provisional Patent Application Ser. No. 62/589,953, filed Nov. 22, 2017, entitled "Automobile Resource Distribution Triggering System," the entirety of which is incorporated herein by reference.

BACKGROUND

Manual interactions between users and third parties that traditionally involve manual or face-to-face conveyance of data and information are inefficient, slow, and often insecure thereby reducing productivity and security associated with all parties involved. As such, there exists a need for a system to improve the efficiency, speed, and data security of performing interactions.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for transferring one or more resources associated with an interaction via an automobile. In some embodiments, the invention receives an input from a user, via one or more components of an automobile, to search for one or more third party entities distributing fuel; identify a location of the user, via the one or more components of the automobile; calculates a first limit based on the location of the user, wherein the first limit is associated with the maximum distance from the location of the user; identifies the one or more third party entities located within the first limit; apply logic to select a third party entity from the one or more third party entities; transfer a location of the third party entity to the user, via the one or more components; continuously identify a current location of the user via the one or more components; determine that the current location of the user matches the location of the third party entity; establish a communication link between the automobile and a third party entity device associated with the third party entity; identifies a trigger from the third party entity device associated with the third party entity, wherein the trigger is associated with transfer of resources to complete an interaction, wherein the interaction is associated with the distribution of fuel; in response to identifying the trigger, initiates the transfer of the resources to complete the interaction; and complete the interaction by transferring the resources to the third party entity device via the one or more components.

In some embodiments, the invention establishes a direct communication link with the one or more components of the automobile. In some embodiments, the invention establishes a communication link with a smart computing device of the user, wherein the smart computing device is connected to the automobile.

In some embodiments, the invention comprises: extracting information associated with one or more resource pools stored in the smart computing device of the user; and transferring the resources in the one or more resource pools to the third party entity device.

In some embodiments, in response to completing the interaction, the invention receives a receipt associated with the interaction from the third party entity device; and integrate the receipt with the interaction posted into a user application stored in the smart computing device.

In some embodiments, the receipt is received when the current location of the user does not match the location of the third party entity.

In some embodiments, the invention completes the interaction by transferring the resources to the third party entity device via a card reader located in the automobile.

In some embodiments, the invention establishes a communication link with the one or more components of the automobile via a smart device, wherein the smart device is located in the automobile.

In some embodiments, the one or more components comprise at least input devices, output devices, positioning system, and other automotive components.

In some embodiments, the invention selects the first third party entity by: identifying user preferences associated with the user; identifying travel time associated with each of the one or more third party entities by communicating with traffic monitoring systems; identifying one or more supplemental resources associated with resource pools of the user; identifying one or more bids received from the identified one or more third party entities; and determining the first third party entity based on at least the user preferences, the travel time, the one or more supplemental resources, and the one or more bids.

In some embodiments, the fuel is at least one of gas, diesel, or electric.

In some embodiments, the maximum distance is based on fuel consumption of the automobile.

In some embodiments, transferring the location of the third party entity to the user further comprises adding the location of the third party entity to a navigation system of the automobile.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
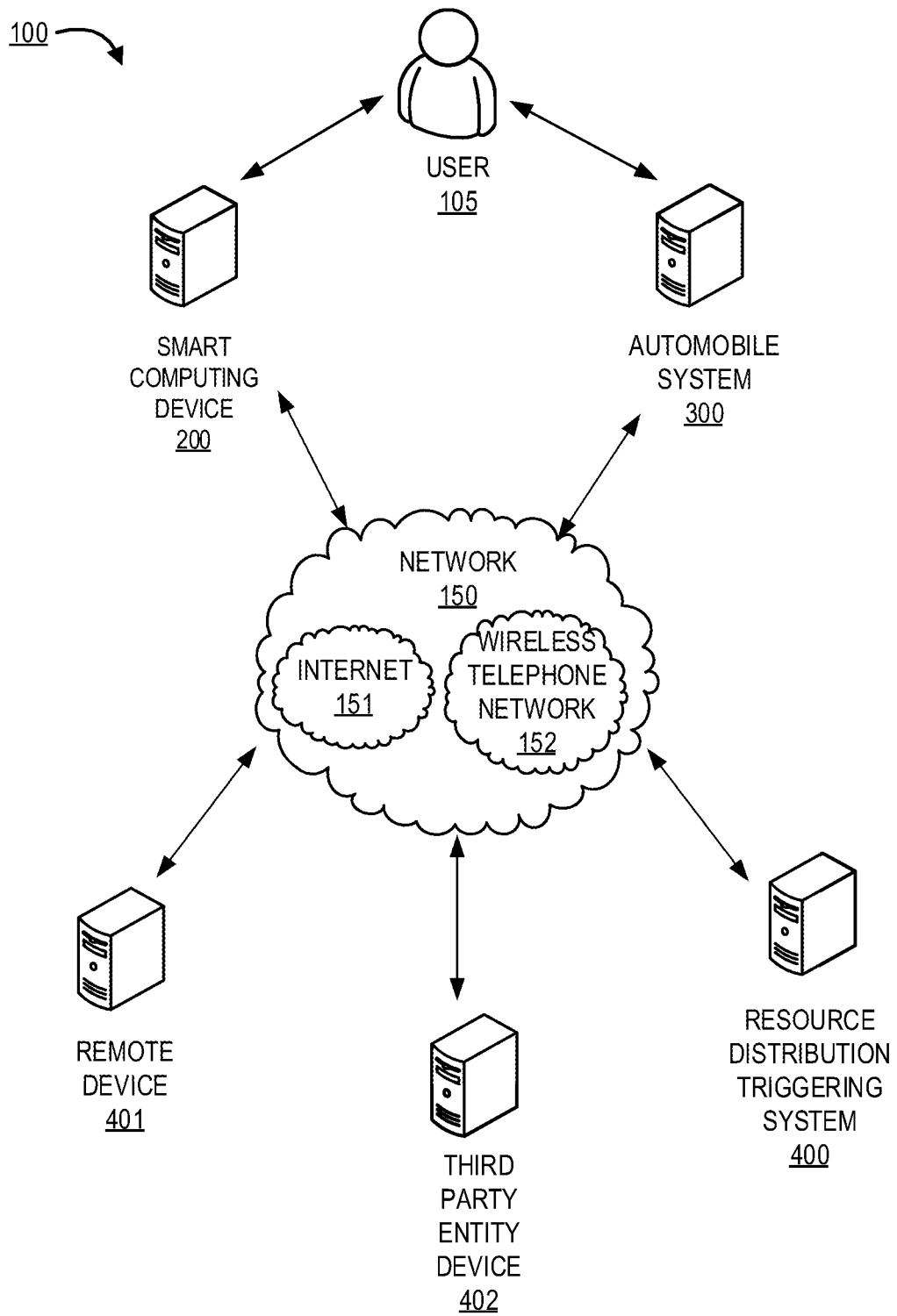
Figure 2:
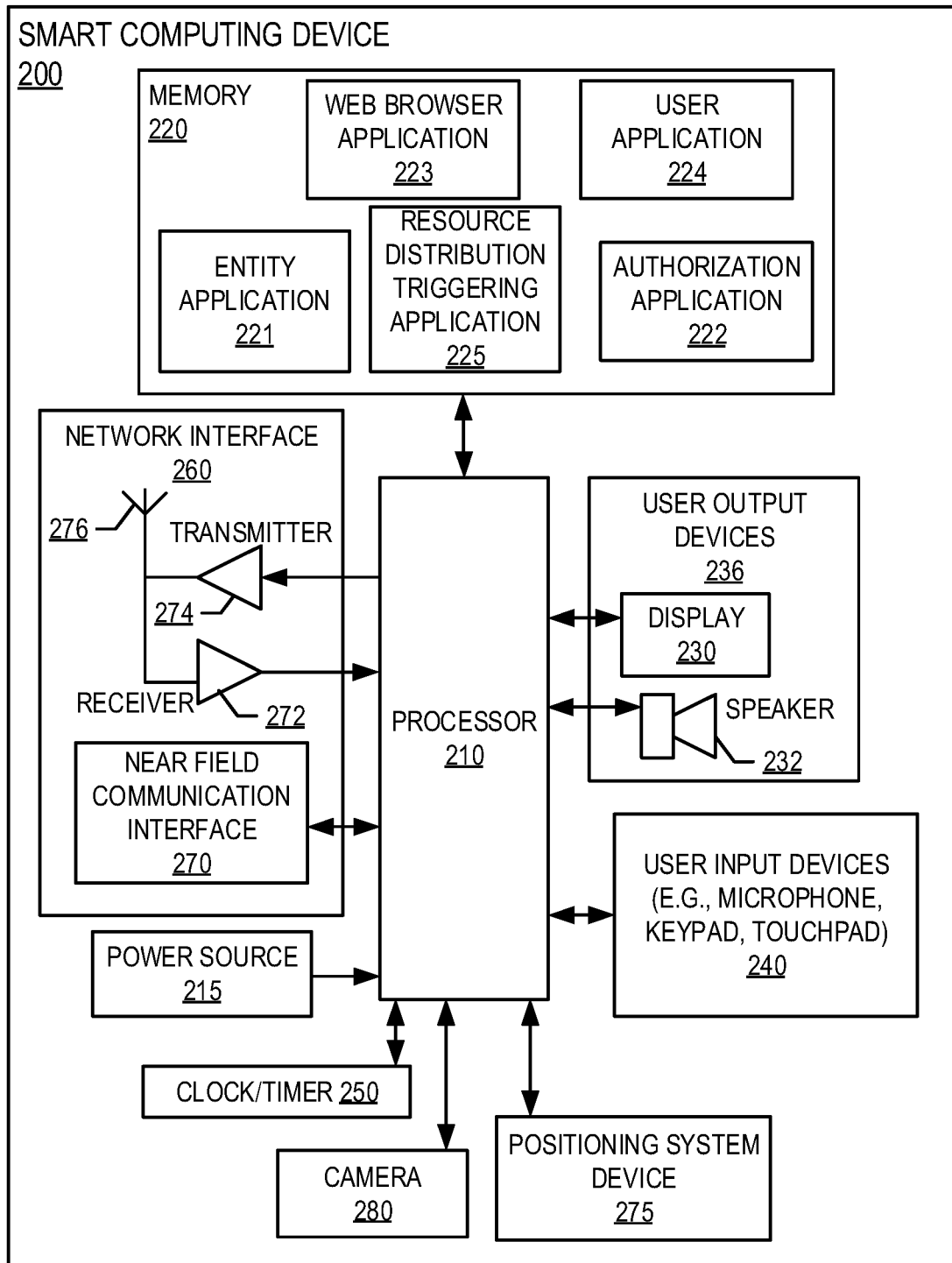
Figure 3:
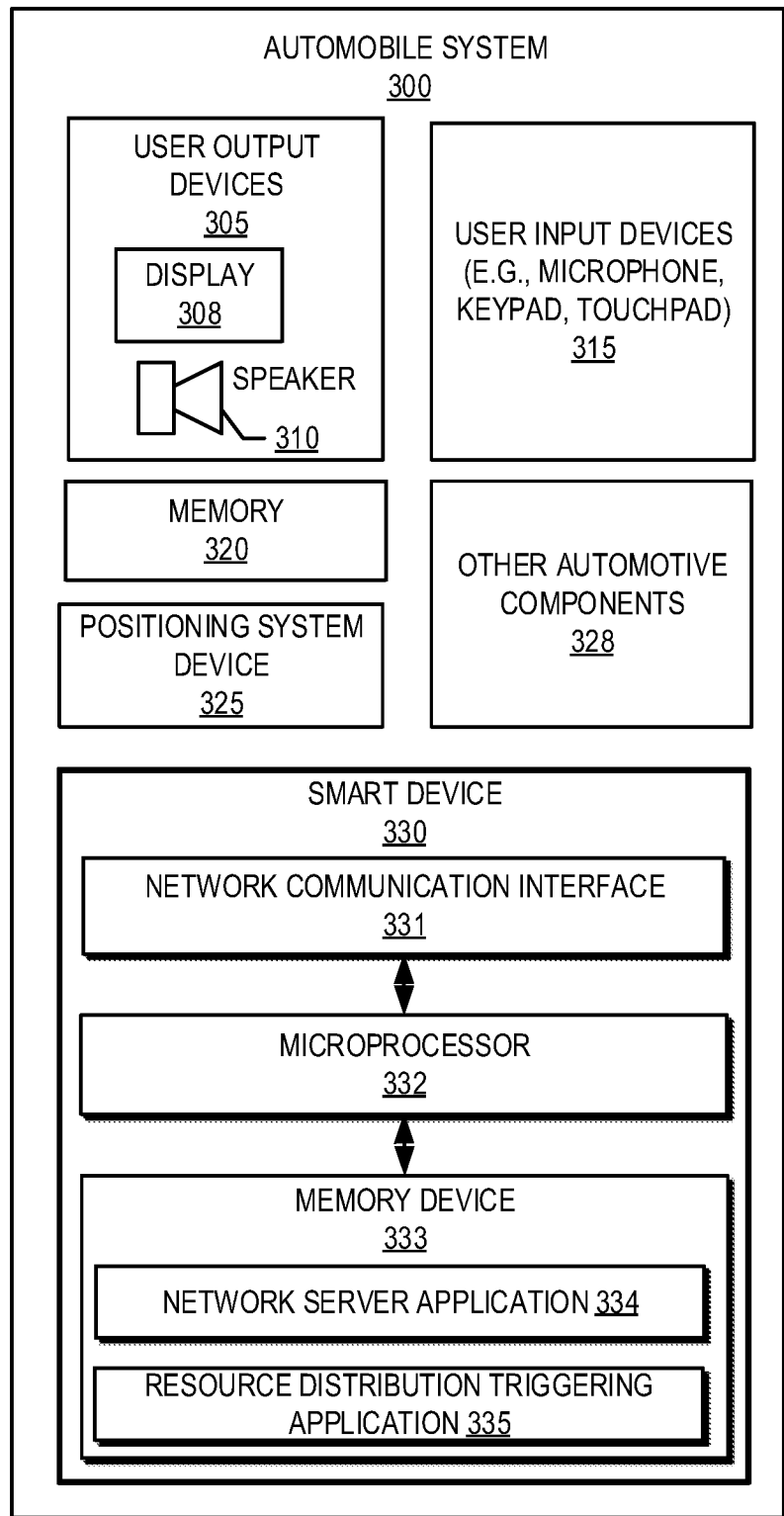
Figure 4:
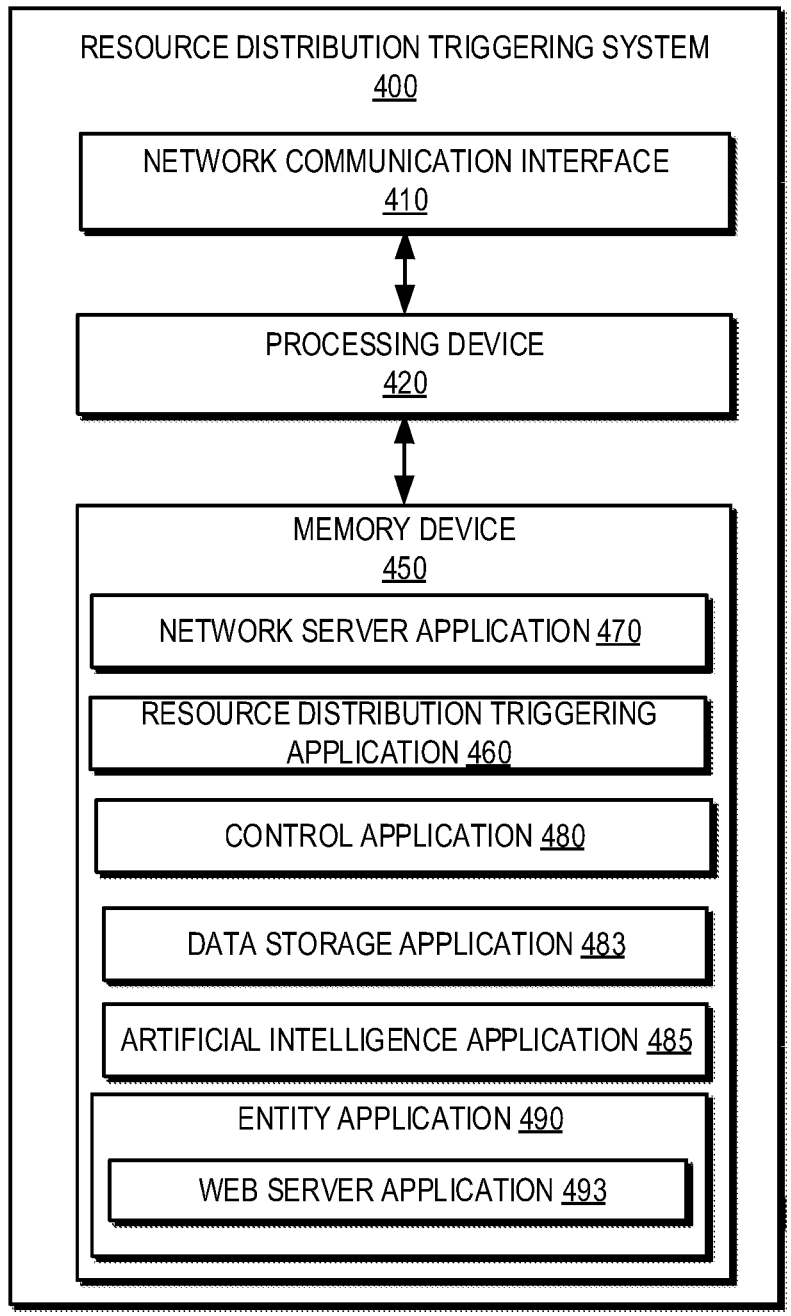
Figure 5:
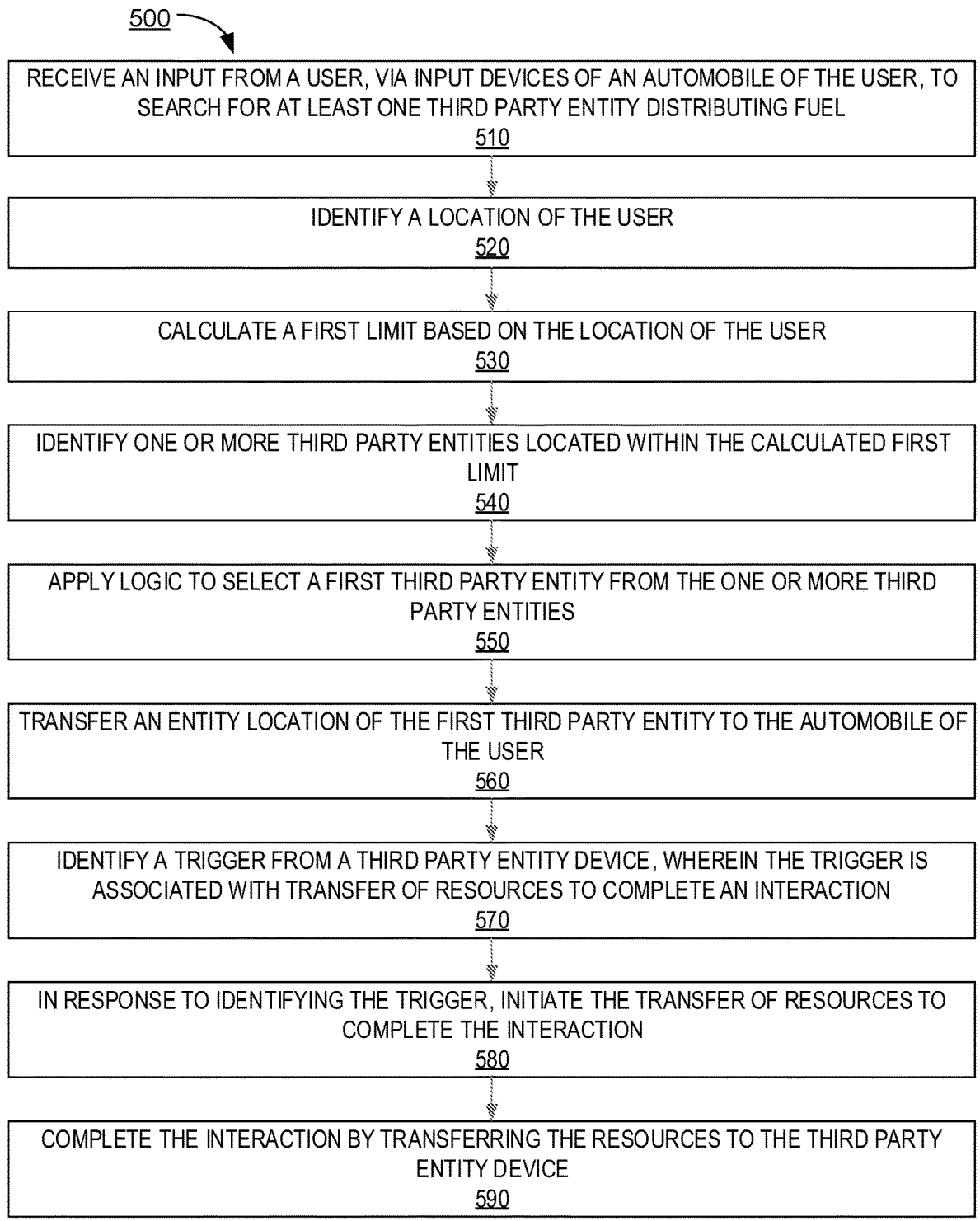
Figure 6:
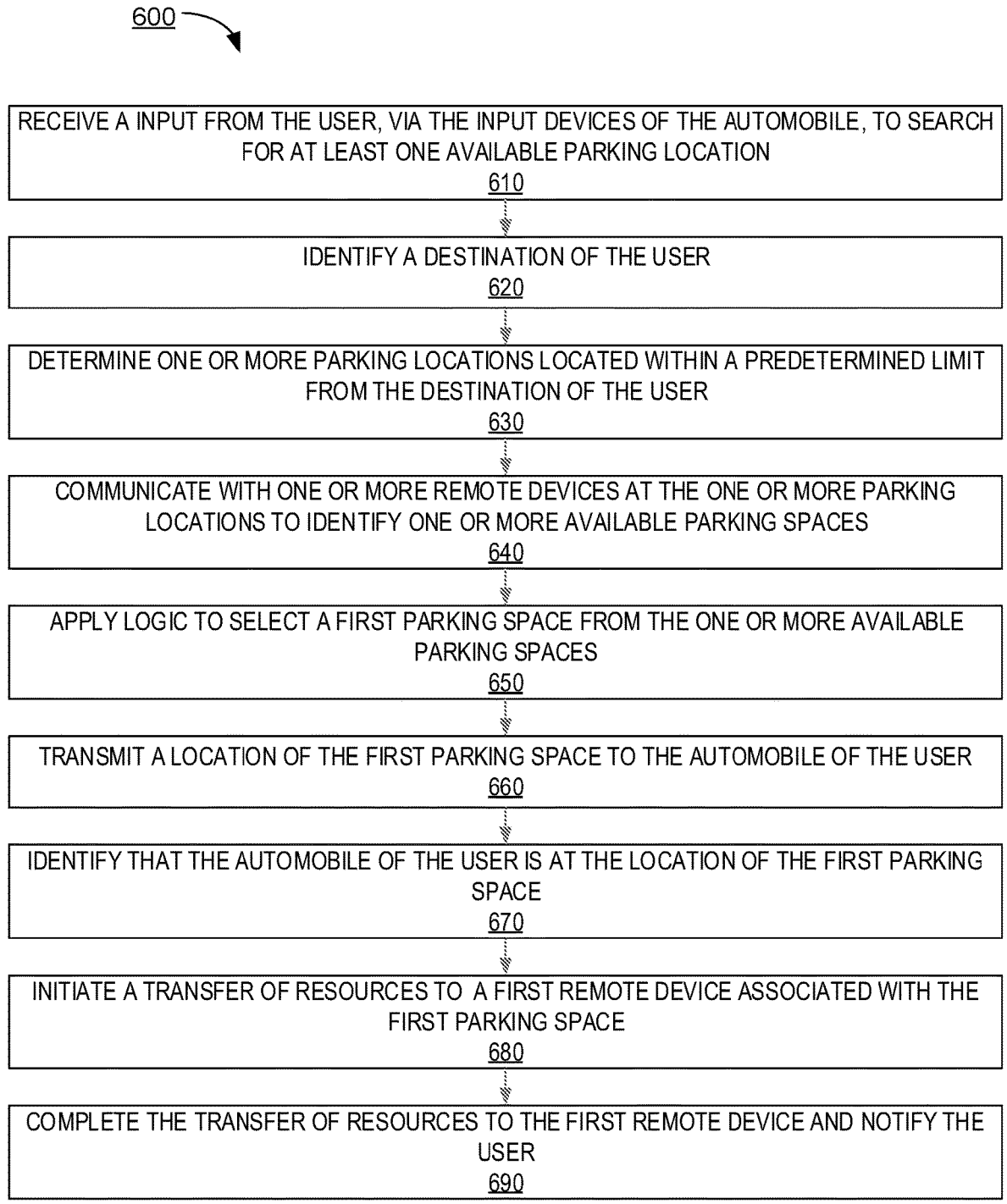
Figure 7:
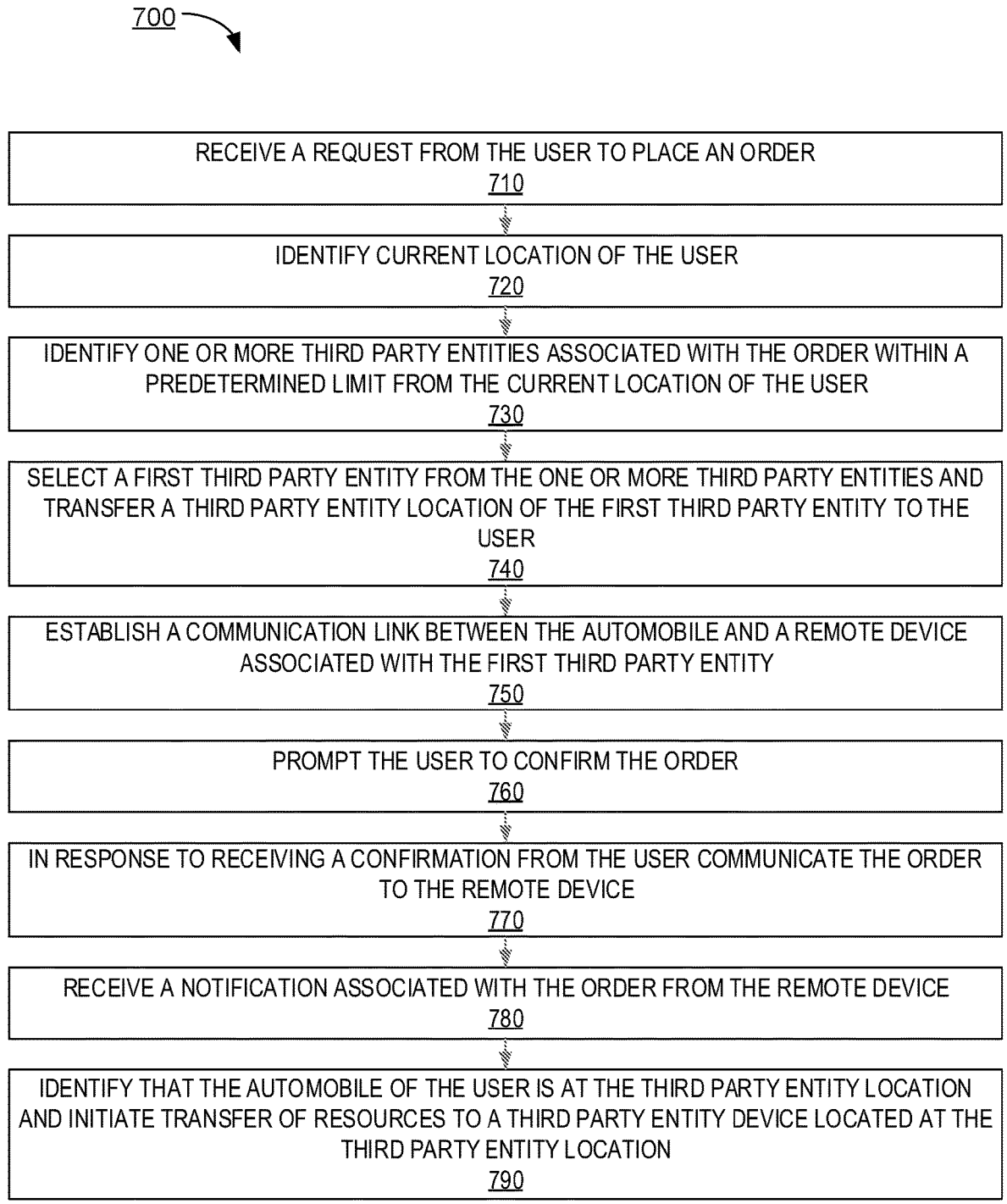
Figure 8:
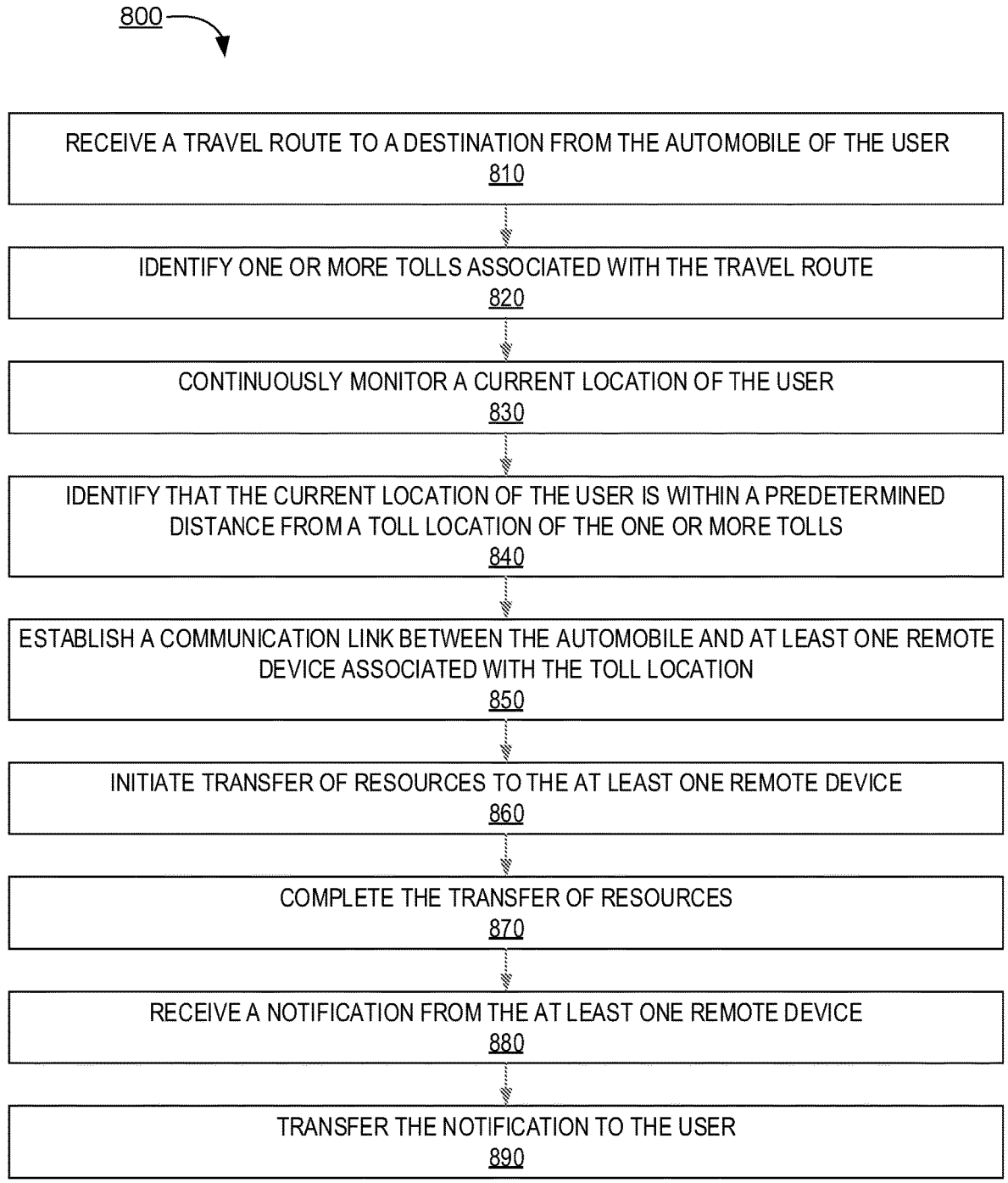
Figure 9:
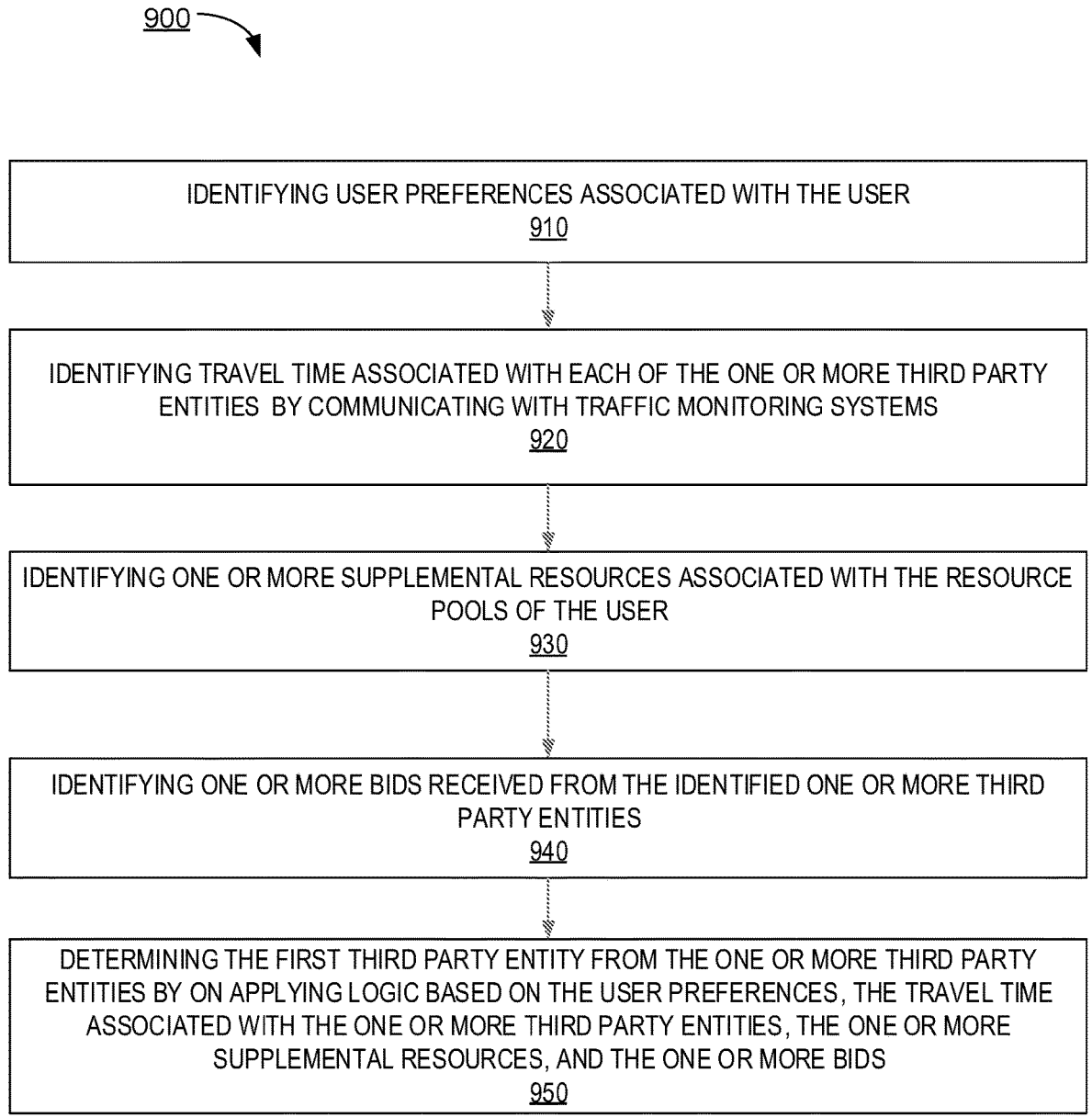

Having thus described embodiments of the invention in general terms, reference will be made to the accompanying drawings, where:

FIG. 1 presents an automobile resource distribution triggering system environment, in accordance with an embodiment of the present invention;

FIG. 2 presents a block diagram illustrating a smart computing device, in accordance with an embodiment of the present invention;

FIG. 3 presents a block diagram illustrating an automobile, in accordance with an embodiment of the present invention;

FIG. 4 presents a block diagram illustrating a resource distribution triggering system, in accordance with an embodiment of the present invention;

FIG. 5 presents a process flow for completing an interaction associated with fuel purchase via the automobile at a third party entity location, in accordance with an embodiment of the present invention;

FIG. 6 presents a process flow for completing an interaction associated with a parking location via the automobile, in accordance with an embodiment of the present invention;

FIG. 7 presents a process flow for communicating an order to a remote device of a third party entity via the automobile, in accordance with an embodiment of the present invention;

FIG. 8 presents a process flow for completing an interaction associated with one or more tolls by communicating with remote devices at toll booths via the automobile, in accordance with an embodiment of the present invention; and FIG. 9 presents a process flow for selecting a first third party entity from one or more third party entities associated with the fuel purchase by applying logic via an artificial intelligence engine, in accordance with an embodiments of the present invention.

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "financial institution" as used herein may include commercial banks, thrifts, federal and state savings banks, savings and loan associations, credit unions, investment companies, insurance companies and the like. In some embodiments, the financial institution may allow a customer to establish an account with the financial institution. An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

In some embodiments, the term "entity" or "third party entity" as used herein may be any merchant offering products or services to one or more users. This may include Quick Service Restaurants (QSR), gas stations, merchants providing parking spaces, toll booths, convenience stores, pharmacy, wholesale merchants, and/or the like. The term "remote device" as used herein may be any computing device utilized by third party entities. The term "third party entity device" may be any computing device provided by third party entities at third party entity locations. This may include point of sale (POS) provided by third party entities at any of the third party locations.

In some embodiments, a "user" may be a financial institution customer (e.g., an account holder or a person who have an account (e.g., banking account, credit account, or the like)). In some embodiments, a "user" may be a customer of a third party entity.

In accordance with embodiments of the invention, an "interaction" may be a transaction, transfer of funds, transfer of resources, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions have already occurred, are in the process of occurring or being processed, or they have yet to be processed/posted by one or more financial institutions.

In accordance with embodiments of the invention, an "account" or "resource credential" or "resource pool" is the relationship that a user has with a financial institution, such as a financial institution. Examples of accounts include a deposit account, such as a transactional account (e.g., a banking account), a savings account, an investment account, a money market account, a time deposit, a demand deposit, a pre-paid account, a credit account, a debit/deposit account, a non-monetary user information that includes information associated with the user, or the like. The account is associated with and/or maintained by the financial institution.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 provides a block diagram illustrating an environment 100 an automobile resource distribution triggering system. As depicted in FIG. 1, the operating environment 100 may include a resource distribution triggering system 400 interacting with a smart computing device 200 and automobile system 300 of a user 105, one or more remote devices 401, one or more third party entity devices 402, using a network 150 that includes an internet 151 and wireless telephone network 152. In some embodiments, the resource distribution triggering system 400 may be maintained by a financial institution. In some embodiments, the resource distribution triggering system 400 may be owned and maintained by the financial institution. In such an embodiment, the resource distribution triggering system 400 communicates with a financial institution system to complete one or more interactions. In some embodiments, the resource distribution triggering system 400 may be a part of an financial institution system (not shown). In alternate embodiments, the resource distribution triggering system 400 may be a part of the automobile system 300. In some embodiments, the resource distribution triggering system 400 may be part of a smart chip which is placed in the automobile system 300. In some embodiments, the resource distribution triggering system 400 may interact with smart computing devices and automobiles associated with a plurality of users (not shown) at any given instance. The user 105 and other plurality of users may be customers of the financial institution or the third party entities.

The environment 100 also may include a plurality of computing devices of the user 105. The computing devices may include any machine, apparatus, system or the like that may be connected to and communicate with other devices over a network 150. The smart computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology.

Referring now to FIG. 2, the smart computing device 200 may be any computing device utilized by the user 105. In embodiments of the present invention, the smart computing device may be any device of the user connected to the automobile of the user via a wired (e.g., USB port) or wireless technology (e.g., Bluetooth). The smart computing device may be any wearable device, laptop, mobile device, smart phone device, PDA, tablet, or any other mobile device. In one embodiment of the invention, there may be multiple smart computing devices, wherein the multiple smart computing devices may be a mobile telephone and a smart watch. Other types of smart computing devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In one embodiment of the present invention, the smart computing device 200 is a mobile device.

Some embodiments of the smart computing device 200 include a processor 210 communicably coupled to such devices as a memory 220, user output devices 236, user input devices 240, and a network interface 260. The smart computing device 200 further includes a power source 215, such as a battery, for powering various circuits and other devices that are used to operate the smart computing device 200. Embodiments of the smart computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the smart computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the smart computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as financial institution application 221, a user application 224, resource distribution triggering application 225, authorization application 222, and/or the like. The user application 224 may be a digital wallet application or any application that maintains virtual cards which is provided by the financial institution system. In some embodiments, the resource distribution triggering application 225 may be a part of the financial institution application 221. In some embodiments, financial institution application 221 may be a mobile banking application. The resource distribution triggering application 225 interacts with the resource distribution triggering system 400 to perform one or more functions. In some embodiments, the authorization application 222 allows the smart computing device 200 to interact with financial institution systems and resource distribution triggering system 400. In some embodiments, the smart computing device may include a fitness tracking application, wherein the fitness tracking application comprises information associated with diet plans, calorie goals, and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the smart computing device 200 may be configured to operate with one or more air interface standards, communication protocols, modulation types, and access types. By way of illustration, the smart computing device 200 may be configured to operate in accordance with any of a number of first, second, third, and/or fourth-generation communication protocols and/or the like. For example, the smart computing device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The smart computing device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the smart computing device 200. In some embodiments, the NFC interface 270 is not supported in and/or on the smart computing device 200, but the NFC interface 270 is otherwise operatively connected to the smart computing device 200 (e.g., where the NFC interface 270 is a peripheral device plugged into the smart computing device 200). Other apparatuses having NFC interfaces mentioned herein may be configured similarly. In some embodiments, the NFC interface 270 of the smart computing device 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the smart computing device 200 wirelessly communicates information (virtual card information such as virtual card number, CVV code, expiration date) stored in the user application 224 to perform a transaction.

As described above, the smart computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the smart computing device 200 to transmit data, may include any of a number of devices allowing the smart computing device 200 to transmit data, such as a keypad, keyboard, touch-screen, touchpad, microphone, mouse, joystick, other pointer device, button, soft key, and/or other input device(s). The user interface may also include a camera 280, such as a digital camera.

The smart computing device 200 may also include a positioning system device 275 that is configured to be used by a positioning system to determine a location of the smart computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the smart computing device 200. In other embodiments, the positioning system device 275 includes a proximity sensor or transmitter, such as an RFID tag, that can sense or be sensed by devices known to be located proximate a location to determine that the smart computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the smart computing device 200 and/or one or more of the process/method steps described herein.

These applications also typically provide a graphical user interface (GUI) on the display 230 that allows the user 105 to communicate with the smart computing device 200, the financial institution system and/or other devices or systems. The memory 220 can also store any of a number of pieces of information, and data, used by the smart computing device 200 and the applications and devices that make up the smart computing device 200 or are in communication with the smart computing device 200 to implement the functions of the smart computing device 200 and/or the other systems described herein. For example, the memory 220 may include such data as user authentication information.

Referring now to FIG. 3, the automobile system 300 comprises one or more components of an automobile. The automobile may be any wheeled motor vehicle comprising user output devices 305, user input devices 315, memory 320, positioning system device 325, other automotive components, and a smart device 330. In some embodiments, the smart device 330 may be a smart chip. The smart chip may be a micro device in the automobile. In embodiments of the invention, the smart chip 330 is provided the financial institution. The smart chip 330 may be integrated into any wheeled vehicles with user input and output devices. In some embodiments, the smart chip is maintained by the financial institution. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize wireless network of the smart computing device 200 connected to the automobile system 300 to provide signals and receive signals to perform one or more steps in the process flows described below. The smart chip 330 may be configured to raise certain triggers and alert the resource distribution triggering system upon occurrence on any of one or more conditions. For example, the smart chip may identify an input from a user via any of the user input devices and may alert the system. In one example, the smart chip may identify that the user has entered a destination location via the user input devices and alerts the system to trigger processes.

The network communication interface 331 may also include a near field communication (NFC) interface. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the smart computing device 200. In some embodiments, the NFC interface is not supported in and/or on the smart computing device 200, but the NFC interface is otherwise operatively connected to the smart computing device 200. For example, smart computing device 200 may be internally connected to the electronic and communication system of the automobile and may utilize the NFC interface of the automobile. In some embodiments, the NFC interface of the smart computing device 200 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the smart computing device 200 wirelessly communicates information (virtual card information such as virtual card number, CVV code, expiration date) stored in the memory 320 of the automobile or user application 224 of the smart computing device 200 to and/or from a corresponding NFC interface of a POS device to perform an interaction.

The memory device 333 may include one or more applications or information accessed or received by the smart chip 330. The memory device, as shown, comprises one or more applications including a network server application 334, resource distribution triggering application 335, and/or the like. The network server application 334 may be configured to cause the microprocessor to interact with other components of the automobile, smart computing device 200, resource distribution triggering system 400, remote device 401, third party entity device 402, and/or other device associated with the network 150. The resource distribution triggering application may be utilized to receive and communicate information to the resource distribution triggering system 400 to perform one or more steps in the process flow described herein. The smart chip 330 may receive instructions from the resource distribution triggering system to perform one or more steps described herein. In some embodiments, the smart chip 330 may receive information from the resource distribution triggering system 400, the third party entity device 402, or the remote device 401 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the resource distribution triggering system 400, the third party entity device 402, or the remote device 401 to perform one or more steps in the process flows described herein. In some embodiments of the present invention, the smart chip 330 may identify current location of the automobile utilizing the positioning system device 325 of the automobile. In some other embodiments, the smart chip 330 may utilize other automotive components 328 or information available in the other automotive components 328 of the automobile. The automotive components, may include any body and main parts, electrical and electronics (including navigation system, gauges and meters, sensors, electrical switches, cameras, audio/video devices, and/or the like), interior components (car seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. In some embodiments, the built in mechanism and the chip reader may be provided by a financial institution. All or some components of the automobile described above may be considered as an automobile system.

FIG. 4 provides a block diagram illustrating the resource distribution triggering system 400, in greater detail, in accordance with embodiments of the invention. As illustrated in FIG. 4, in one embodiment of the invention, the resource distribution triggering system 400 includes one or more processing devices 420 operatively coupled to a network communication interface 410 and a memory device 450. In certain embodiments, the resource distribution triggering system 400 is operated by a financial institution, such as a financial institution. In some embodiments, the resource distribution triggering system 400 is part of a system of the automobile system 300, wherein the resource distribution triggering system 400 may be embedded within any component of the automobile. In some embodiments of the invention, the resource distribution triggering system 400 is part of the smart chip 330, wherein the smart chip 330 is placed in the automobile and is a part of the automobile. In such an embodiment, the system establishes a direct communication link with the automobile system. In some embodiments, the resource distribution triggering system 400 may be an independent system, wherein the resource distribution triggering system 400 communicates with the automobile to performs one or more actions described in the process flows below via the smart chip 330 of the automobile. In such an embodiment, the system establishes a communication link with the automobile system via the smart chip. For example, the system may communicate with user input devices 315, positioning device 325, other automotive components 328, and user output devices 305 via the smart chip 330. In such embodiments, the system may connect with the smart computing device 200 of the user via the smart chip 330, wherein the smart computing device 200 is present with the user and wherein the smart computing device 200 may be connected with the automobile system 300. In some embodiments, the smart computing device 200 may not be connected with the automobile system 300 via wired or wireless technology.

In one embodiment, the resource distribution triggering system 400 is part of a financial institution system. In such an embodiment, a resource distribution application performing the operations of the resource distribution triggering system 400 is stored in the entity system. In such embodiments, the smart chip may be configured to perform one or more steps of the process flows described herein and the resource distribution triggering system monitors and controls the smart chip and provides any additional information required to perform the one or more steps. In some embodiments, the resource distribution triggering system 400 may be a part of the smart chip 330 in the automobile.

It should be understood that the memory device 450 may include one or more applications and one or more databases or other data structures/repositories. The memory device 450 also includes computer-executable program code that instructs the processing device 420 to operate the network communication interface 410 to perform certain communication functions of the resource distribution triggering system 400 described herein. For example, in one embodiment of the resource distribution triggering system 400, the memory device 450 includes, but is not limited to, a network server application 470, a resource distribution triggering application 470, control application 480, a data storage application 483, artificial intelligence engine application 485 and other computer-executable instructions or other data. The computer-executable program code of the network server application 470, the resource distribution triggering application 470, the control application 480, and the data storage application 483, artificial intelligence engine application 485 may instruct the processing device 420 to perform certain logic, data-processing, and data-storing functions of the resource distribution triggering system 400 described herein, as well as communication functions of the resource distribution triggering system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The resource distribution triggering system 400, communicates with the smart chip 330 of the automobile to perform various steps described herein. The resource distribution triggering system 400, communicates with remote devices 401 and third party entity devices 402 to perform various steps described herein. In some embodiments, the resource distribution triggering system 400, communicates with other systems such as traffic monitoring system, entity system, authorization systems, and/or the like. The resource distribution triggering system 400 also comprises an artificial intelligence engine.

FIG. 5 presents a process flow 500 for completing an interaction associated with fuel purchase via the automobile at a third party entity location. As shown in block 510, the resource distribution triggering system 400 receives an input from the user to search for at least one third party entity distributing fuel. Fuel may be any of the available forms of fuel including, but not limited to, diesel, gas, electric, or the like. The input may be a voice command, a text command, and/or the like received from the user via the user input devices 315 of the automobile. The system instantly recognizes the input received from the user via the user input devices. In some embodiments, the system may identify that fuel in the automobile has dropped below a predetermined limit and automatically communicates a low fuel input to the system. In some embodiments, the system may communicate with other automobile components such as gauges or meters to identify that fuel in the automobile has dropped below a predetermined limit. For example, the predetermined limit may be 1 gallon in non-electric automobiles or 10 percent in electric automobiles. In some embodiments, the system may identify that the user is travelling to a destination and determine that refueling is required to reach the destination. The system then prompts the user, via the user output devices 305, to determine if the user would like to refuel. Upon receiving an input from the user, the system continues the process and proceeds to block 520.

As shown in block 520, the system then identifies, a current location of the user. The system communicates with the positioning system device 325 to identify the current location of the user. In some embodiments, the system may connect with the smart computing device 200 such as mobile device and may utilize the positioning system device 275 to determine the current location of the user. In such embodiments, the smart computing device 200 may be connected with the automobile 300 via wired or wireless technology associated with the smart computing device 200. In some embodiments, the system may connect with the smart computing device 200 via the smart chip 330 in the automobile 300. In some embodiments, the system may use satellite data to determine the location of the user. The system along with identifying the current location of the user, determines the level of fuel in a gas tank of the automobile 300 by communicating with other automobile components 328 of the automobile 300. For example, the system may communicate with a system/component of the automobile 300 to retrieve fuel gauge data.

As shown in block 530, the system calculates a first limit based on the location of the user. The first limit is the maximum distance that the user can travel before running out of fuel based on the current location of the user and the level of fuel in the gas tank previously identified by the system. In other words, the maximum distance is based on the fuel consumption of the automobile. In some embodiments, the system may also identify the travel route and the destination of the user and communicate with traffic monitoring systems (not shown) to determine traffic in the travel route of the user. The system uses the current traffic information to calculate the first limit.

As shown in block 540, the system identifies the one or more third party entities located within the calculated first limit. The one or more third parties may be any merchants (e.g., gas stations) selling fuel located within the first limit from the current location of the user. The system identifies the one or more third parties along the travel route of the user.

As shown in block 550, the system applies logic to select a first third party entity from the one or more third party entities. FIG. 9 presents a process flow 900 for selecting the first third party entity from the one or more third party entities. As shown in block 910, the system identifies user preferences associated with the user. For example, the user may prefer a particular gas station or a particular type of fuel (diesel, electric, gas, premium, regular, and/or the like) available at the gas stations. The user preferences may be stored in the memory of the smart computing device 200 or the memory of the automobile 300. The system retrieves user preference data and identifies that the user prefers going to merchant 'A' over merchant 'B' of the one or more third party entities. As shown in block 920, the system identifies travel time associated with each of the one or more third party entities by communicating with traffic monitoring systems (not shown). For example, the system may identify that traffic associated with the travel route to go to merchant 'A' is less than the travel route associated with merchant B' of the one or more third party entities. Additionally, the system may also identify the travel distance to each of the identified one or more third party entities. As shown in block 930, the system identifies one or more supplemental resources associated with the resource pools of the user. Supplemental resources may be any of rewards, cashback, membership perks, associated with any of the resource pools of the user. For example, the system may identify that resource pool 'A' has a cashback deal with merchant 'A' of the one or more third party entities. In some embodiments, the system may access supplemental resource information associated with resource pools of the user by accessing the user application 224 or financial institution application 221 of the smart computing device 200. In some embodiments, the system may access supplemental resource information by communicating with financial institution system associated with the resource pools. As shown in block 940, the system identifies one or more bids received from the identified one or more third party entities. For example, after identifying the one or more third party entities in block 540, may notify the one or more third party entities about a potential opportunity (purchase of fuel by the user). The one or more third party entities may send one or more bids to the system in response to receiving a notification with the potential opportunity. The system may identify the one or more bids and may identify that Merchant 'A' is offering fuel for a lower price compared with other merchants of the identified one or more third party entities. In some embodiments, wherein the price of the fuel is fixed, the system may identify the merchant offering the lowest prices by communicating with systems associated with the one or more third party entities. Next, as shown in block 950, the system determines the first third party entity from the one or more third party entities by applying logic based on the user preferences, traffic associated with the one or more third party entities, the one or more supplemental resources, and the one or more bids received from the one or more third party entities. For example, the system may identify that a merchant 'A' located at distance 'A' is selling fuel at a lower price than a merchant 'B' located at distance 'B' which is lower than distance 'A' at a price higher than the price offered by Merchant 'A.' In such an exemplary embodiment, the system considers the current traffic, user preferences (such as a particular gas station or a type of fuel available at the gas stations, and/or the like), and supplemental resources (rewards or cashback, membership perks) associated with the resource pool (credit account, debit account, or the like) of the user to select a merchant from the one or more merchants initially identified by the system. In some embodiments, the automobile 300 may be utilized by one or more users. The system applies logic based on the user driving the car. The system identifies the user driving the car by communicating with the other automotive components of the automobile to identify driving patterns, weight of the user in the driver seat, driver seat preferences, or the like.

Referring back to FIG. 5, as shown in block 560, the system transfers an entity location of the first third party entity to the automobile. The system may automatically add the entity location to the selected travel route of the user via the navigation system of the automobile 300. In some embodiments, the system may add the entity location to the selected travel route of the user after receiving an approval from the user. In some embodiments, the system may identify a second third party entity from the one or more third party entities by applying logic based on receiving disapproval from the user and the system may add user's disapproval to the user preferences. In some embodiments, the system may store preferences associated with the user's disapproval in the memory of the automobile 300. In some embodiments, the system may store preferences associated with the user's disapproval in the memory of the smart chip 330. In some embodiments, the system upon adding the entity location to the selected travel route of the user, communicates with remote devices (e.g., fuel dispenser monitoring device, fuel station system) associated with the first third party entity to identify an empty refueling station and block the empty refueling station for the user. The system may receive a confirmation from the remote device about reserving the refueling station and may communicate the confirmation to the user via the user output devices of the automobile.

In some embodiments, the system may access one or more to-do lists of the user stored in the smart computing device of the user, and may identify that one or more products in the to-do list (e.g., grocery list) are available at the first third party entity location. The system may then communicate, after receiving an approval from the user, an order comprising one or more products in the to-do list to the third party devices (online ordering platform) associated with the first third party entity, wherein an employee of the first third party entity after receiving the order may fulfill the order before the user reaches the third party entity location. In some embodiments, the system may identify that the user purchased a set of products after refueling during the last visit and may prompt the user to identify if he/she would like to order same products before reaching the third party entity location.

The system after transferring the location of the first third party entity, continuously monitors a current location of the user, via the one or more components of the automobile and identifies that the current location of the user matches the location of the first third party entity. The system may then establish a communication link between the automobile and a third party entity device (e.g., fuel dispenser or point of sale or fuel station system), at the location of the first third party entity. In some embodiments, the system establishes the communication link between the automobile and a third party entity device by utilizing transmitting devices in the automobile and the third party entity device. In some embodiments, wherein the current location of the user matches the location of the first third party entity, the system may utilize the NFC interface in the automobile and the third party entity device to establish the communication link.

As shown in block 570, the system identifies a trigger from the third party entity device (e.g., fuel dispenser or point of sale), wherein the trigger is associated with transfer of resources to complete an interaction (transaction associated with fuel purchase). The trigger may be a payment request from the point of sale device, wherein the trigger comprises a unique identifier associated with the fuel purchase of the user. The system connects to the third party entity device (point of sale) using NFC interface to identify a resource amount (purchase amount).

As shown in block 580, the system in response to identifying the trigger, initiates the transfer of resources to complete the interaction. The system selects a best resource pool information from one or more resource pools of the user based on the supplemental resources offered (rewards, or the like). In some embodiments, the system accesses the resource pool information from the user application 224 (e.g., mobile wallet application or the like) in the smart computing device 200 connected to the automobile 300. In some embodiments, the system accesses the resource pool information from the memory of the automobile, wherein a system associated with the automobile, after identifying that the smart computing device is connected to the automobile 300 via wired or wireless technology, extracts the user resource pool information from the smart computing device 200 and stores it in the memory of the automobile 300. The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the third party entity device (point of sale). In another embodiment, the system may use facial recognition or finger printing or the like to authenticate the interaction. The system utilizes the wireless network of the automobile to transfer the best resource pool information to the third party entity device.

As shown in block 590, the system completes the interaction by transferring the resources to the third party entity device. The system transfers the resource amount from the identified best resource pool to the third party entity device. After completing the interaction, the third party entity device may transfer a receipt associated with the interaction to the automobile. At this time, the user need not wait at the third party entity location to receive the receipt. In an exemplary embodiment, after refueling the user may drive away from the third party entity location and the transfer of resources may be performed by the system without having the user to stay at the third party entity location. Similarly, the third party entity device may transfer a receipt while the user is not at the third party entity location. In some embodiments, the system may link or integrate the receipt into a user application or a financial institution application of the smart computing device 200. For example, upon completion of the transaction associated with the fuel purchase, the transaction may be posted into a resource pool (e.g., checking account) in the financial institution application (e.g., online application) on the mobile device 200. The system may integrate the receipt received from the third party entity device with the transaction posted in the resource pool via the financial institution application.

In some embodiments, the system may also transfer a second resource amount associated with the order (associated with the to-do lists) placed before arriving at the third party entity location, thereby allowing the user to pick up the one or more products directly. In such embodiments, the system may utilize a card reader present in the automobile 300 to perform the interaction before arriving at the third party entity location. In some embodiments, the system after completion of transfer of second resource amount to the point of sale, receives a QR code or any other code from the third party entity device and transfers the received code to the one or more computing devices of the user. The user may provide this code at a pick-up location within the third party entity location to collect the one or more products of the order. In some embodiments, the system upon receiving an input from the user to search for Automated Teller Machines, may follow similar process to place an order at an Automated Teller Machine for withdrawing cash or the like and reserving the Automated Teller Machine for the user.

FIG. 6 presents a process flow 600 for completing an interaction associated with a parking location via the automobile. As shown in block 610, the system receives an input from the user, via the input devices of the automobile, to search for at least one available parking location. The input may be a voice command, a text command, and/or the like received from the user via the user input devices 315 of the automobile. The system instantly recognizes the input received from the user. In some embodiments, the system may identify current location of the user and based on the travel patterns may automatically identify that the user is searching for the at least one available parking location. In some embodiments, travel patterns may be stored in the memory of the automobile. In some embodiments, the travel patterns may be stored in the memory of the smart computing device. In other embodiments, the travel patterns may be stored in the memory of the system.

As shown in block 620, the system identifies a destination of the user. The system communicates with the navigation system of the automobile to identify the destination of the user. As shown in block 630, the system determines one or more parking locations located within a predetermined limit from the destination of the user. For example, the system may identify all parking locations within half a mile from the destination. As shown in block 640, the system communicates with one or more remote devices at the one or more parking locations to identify one or more available parking spaces. For example, the system communicates with parking meter monitoring systems to identify one or more available parking spaces within each of the one or more parking locations. Additionally, the system may also identify the exact location of each of the one or more available parking spaces.

As shown in block 650, the system applies logic to select a first parking space from the one or more available parking spaces. The system may apply logic based on the current traffic near each of the one or more parking locations, distance between the elevator or stairs and the exact location of each of the one or more available parking spaces, pricing of the one or more available parking spaces, offers associated with the one or more available parking spaces, user preferences, one or more to-do lists, and/or the like. For example, the system may access one or more to-do lists of the user stored in the smart computing device 200 (smart watch, mobile device, or the like) of the user and may identify that the user has "pick up clothes from dry cleaners" listed in the to-do list of the user and the system considers a parking space available closer to the dry cleaners.

As shown in block 660, the system transmits a location of the first parking space to the user via the output devices of the automobile. The system automatically adds the location of the first parking space as the destination, via the navigational system of the automobile. In some embodiments, the system may add the location to the destination after receiving an approval from the user. The system upon adding the location to the destination, communicates with remote devices (parking meter monitoring system) associated with the first parking space to reserve the first parking space for the user.

As shown in block 670, the system identifies that the automobile of the user is at the location of the first parking space by continuously monitoring the current location of the user. The system identifies that the user has reached the parking space by identifying the current location of the user. After identifying that the user has reached the location of the first parking space, the system establishes a communication link between the automobile and a first remote device (parking meter). In some embodiments, the system may establish the communication link between the automobile and the first remote device when the current location of the user does not match the location of the first parking space. In such an embodiment, the system allows the user to block the first parking space via the communication link between the automobile and the first remote device. As shown in block 680, the system initiates a transfer of resources to the first remote device associated with the first parking space. The system selects a best resource pool information from one or more resource pools of the user based on the supplemental resources offered (rewards, or the like). The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the first parking space. In another embodiment, the system may use facial recognition or finger printing or the like to authenticate the interaction.

In an exemplary embodiment, a parking meter may not be available on every floor at all parking locations. The system connects with the parking meters remotely after identifying that the automobile of the user is at the location of the first parking space and initiates transfer of resources to the parking meter located on another floor at the parking location. As shown in block 690, the system completes the transfer of resources to the first remote device and notifies the user. In some embodiments, the system may utilize the chip reader in the automobile for completing the interaction. After completion of transfer of resources, the system may receive a receipt from the remote device i.e., the parking meter. The system may automatically save the receipt in the memory of automobile, smart chip, and/or the smart computing devices of the user. In some embodiments, the system may link or integrate the receipt into a user application or an financial institution application of the smart computing device 200. For example, upon completion of the transaction associated with the first parking space, the transaction may be posted into a resource pool (e.g., checking account) financial institution application (e.g., online application) on the smart computing device 200. The system may integrate the receipt received from the first remote device with the transaction posted in the resource pool via the financial institution application. In some embodiments, the system receives the receipt immediately upon completion of the interaction.

In some embodiments, the pricing associated with the first parking space may be hourly pricing. In such embodiments, the system may identify a resource amount associated with the first parking space when the user is leaving the location associated with the first parking space. The system may utilize the communication link established between the automobile and the first remote device to transfer the resource amount to the first remote device. In some embodiments, the transfer of resources may occur when the real-time location of the user does not match the location of the first parking space, thereby allowing the user to pay without having to wait the parking location or the first parking space.

FIG. 7 presents a process flow 700 for communicating an order to a remote device of a third party entity via the automobile. As shown in block 710, the system receives a request from the user, via the input devices of the automobile, to place an order. The order may be a fast food order, a prescription refill order or the like which involves picking up one or more products associated with the order at a drive-through. The order may be received as an input from the user. The input may be a voice command, a text command, and/or the like received from the user via the user input devices 315 of the automobile.

In an exemplary embodiment, the system, after receiving a fast food order from the user, calculates the number of calories associated with the fast food order. The system may access the fitness tracking application in the smart computing device of the user and may identify that the calculated calories in the current order of fast food may cross the limit of daily calorie intake of the user. The system may then suggest alternative fast foods with less calories to the user and prompts the user to identify if he/she would like to switch the order. Based on the user input, the system finalizes the order and may look for one or more third party entities providing one or more products in the finalized order. Additionally, the system may also communicate with a budgeting application of the smart computing device 200 and may alert the user of spending goals. For example, the system may identify that the prices of the current order may exceed the spending goals set by the user and may notify the user via the output devices of the automobile system.

As shown in block 720, the system identifies current location of the user. The system communicates with the positioning system device 325 to identify the current location of the user. In some embodiments, the system may use satellite data to determine the location of the user. Additionally, the system may also identify a destination, via the navigation system of the automobile 300. As shown in block 730, the system identifies one or more third party entities associated with the order within a predetermined limit from the current location of the user. For example, the system identifies one or more third parties within five miles from the current location of the user. In some embodiments, the predetermined limit may be fixed. In some embodiments, the predetermined limit may be dynamic. For example, the system may choose the predetermined limit based on a time estimate for the order to be ready. In some embodiments, the system may estimate a time required to prepare one or more products associated with the order based on time of the day. For example, if the order is a fast food order and the user sends a request to place an order during lunch hour, the system may estimate that the order may take more amount of time than the usual time taken to prepare one or more products. In other words, the system intelligently identifies the predetermined limit, therefore allowing the user to pick up the order at a drive-through without having to wait for the order. The system identifies one or more third parties between the current location and destination and along the travel route selected by the user, that are offering the one or more products associated with the request.

As shown in block 740, the system selects a first third party entity from the one or more third party entities and transfers a third party entity location of the first third party entity to the user. The system, via the artificial intelligence engine, applies logic to select the first third party by considering one or more factors such as rating of the one or more third party entities, user preferences, supplemental resources associated with the one or more third party entities, current traffic, detour distance, or the like. As shown in block 750, the system establishes a communication link between the automobile system and a remote device (online ordering platform) associated with the first third party entity. The system communicates with the remote device to open a new order ticket.

As shown in block 760, the system prompts the user to confirm the order, via the output devices of the automobile. For example, the system may read the order to the user via the speaker. In some embodiments, when the order is a fast food order, the system identify that the user ordered additional condiments in a previous order similar to the present order based on the past ordering history. The system may also read out the additional condiments placed in the previous order to the user and may prompt the user to confirm the additional condiments to be requested along with the order.

As shown in block 770, the system in response to receiving a confirmation from the user, via the input devices of the automobile, communicates the order to the remote device. The system may add the one or more products and additional condiments to the new ticket opened by the system by communicating with the remote device. The system may additionally calculate estimated arrival time of the user based on the traffic, current location, driving patterns, or the like and may communicate the calculated estimated arrival time of the user to the remote device.

As shown in block 780, the system receives a notification associated with the order from the remote device. The notification may include an resource amount i.e., total cost of the order, order confirmation, a confirmation code (e.g., QR code), drive-through slot number, order status tracking link, or the like. The system may then automatically initiate transfer of resources to the remote device the wireless network of the automobile to the remote device. In some embodiments, the system may utilize the chip reader in the automobile to transfer the resources directly to the remote device via the communication link established between the automobile device and the remote device. In some embodiments, the system may cause the financial institution application (e.g., online banking application) or user application (e.g., digital wallet) on the smart computing device to transfer the resources to the remote device. In one such embodiment, the system may utilize the card reader to transfer the resources. In alternate embodiments, as shown in block 790, the system identifies that the automobile of the user is at the third party entity location and initiates transfer of resources via the NFC interface to a third party entity device located at the third party entity location. For example, the system may identify that the user is at the drive-through slot number associated with the user and may establish a communication link via the NFC interface of the automobile with a point of sale device at the drive-through slot and may communicate the confirmation code to the point of sale device. The system may then access the user application (e.g., digital wallet application) and choose a best resource pool from the one or more resource pools associated with the user may transfer the resources associated with the resource amount from the best resource pool to the point of sale device. In some embodiments, in response to transferring the resources, the third party entity device may transmit a receipt to the user. The system may then integrate the receipt with a corresponding transaction posted in the resource pool of the user via the financial institution application or user application in the smart computing device 200.

FIG. 8 presents a process flow 800 for process flow for completing an interaction associated with one or more tolls by communicating with remote devices at toll booths via the automobile system. As shown in block 810, the system receives a travel route to a destination from the user, via the input devices of the automobile. The user may input a destination into the navigation system of the automobile and select a travel route associated with the destination. The system identifies that the user selected the travel route. In some embodiments, the system may automatically select a best travel route based on the traffic conditions, road closure, and/or the like. As shown in block 820, the system identifies one or more tolls associated with the travel route. In some embodiments, the system may identify one or more tolls by communicating with navigation systems of the automobile. In some embodiments, the system may identify the one or more tolls by communicating with remote navigation systems. Alternatively, the system may identify one or more tolls by communicating with user application (navigation application) of the mobile device.

As shown in block 830, the system continuously monitors a current location of the user. In some embodiments, the system monitors the current location of the user via the positioning system device 325 of the automobile 300. In alternate embodiments, the system monitors the current location of the user via the positioning system device 275 of the smart computing device 200. Additionally, the system may also current traffic conditions along the travel route by communicating with the traffic monitoring systems.

As shown in block 840, the system identifies that the current location of the user is within a predetermined distance from a toll location of the one or more tolls. In some embodiments, the predetermined distance may be set by the user. For example, the system identifies that the current location is two miles away from the next toll booth in the travel route. In some embodiments, the system based on the current traffic conditions and calculates a new predetermined distance based on the current traffic conditions. For example, if the travel time to the next toll booth is thirty minutes and the travel distance is two miles, the system calculates a new predetermined limit which may be quarter mile from the next toll booth. Therefore, by calculating the new predetermined limit, the system may avoid paying for unnecessary tolls in instances when there is a traffic diversion.

As shown in block 850, the system establishes a communication link between the automobile system and at least one remote device such as online toll payment platform associated with the toll location. For example, the system establishes a communication link and the wireless network of the automobile. The system, via the communication link identifies a resource amount associated with the toll. Alternatively, in some embodiments, the system may identify the resource amount by communicating with any toll calculator systems. In some embodiments, the system may identify the resource amount by communicating with user applications (toll calculator) in the smart computing device 200.

As shown in block 860, the system initiates transfer of resources to the at least one remote device. The system selects a best resource pool information from one or more resource pools of the user based on the supplemental resources offered (rewards, or the like). The system after identifying the best resource pool, transfers the resource associated with the resource amount to the at least one remote device. As shown in block 870, the system completes the transfer of resources. In some embodiments, the system utilizes the chip reader in the automobile to complete the transfer of resources.

As shown in block 880, the system receives a notification from the remote device. The notification may include a payment confirmation, a toll lane number, or the like. As shown in block 890, the system transfers the notification to the user via the output devices of the automobile. For example, the system may read the toll lane number associated with the notification received from the at least one remote device via the speaker of the automobile. Additionally, the system may also receive a receipt associated with the interaction from the remote device. The system may integrate the receipt with the interaction posted to the resource pools via the financial institution application or user application in the smart computing device.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for communicable integration of an automobile system and a fuel station system, the system comprising:
   one or more memory devices having computer readable code stored thereon;
   one or more processing devices operatively coupled to the one or more memory devices, wherein the one or more processing devices are configured to execute the computer readable code to:
   receive an input from a user, via one or more components of an automobile, to search for one or more third party entities distributing fuel;
   identify a location of the user, via the one or more components of the automobile;
   calculate a first limit based on the location of the user, wherein the first limit is associated with a maximum distance from the location of the user that the user can travel without running out of fuel;
   identify the one or more third party entities located within the first limit;

apply logic to select a third party entity from the one or more third party entities;
transfer a location of the third party entity to the user, via the one or more components;
continuously identify a current location of the user via the one or more components;
determine that the current location of the user matches the location of the third party entity;
establish a first communication link between the automobile and a third party entity device associated with the third party entity;
identify a trigger from the third party entity device, wherein the trigger is associated with transfer of resources to complete an interaction, wherein the interaction is associated with the distribution of fuel;
in response to identifying the trigger, automatically initiate the transfer of the resources from a resource pool associated with the user, to complete the interaction with the third party entity device;
complete the interaction by transferring the resources to the third party entity device via the one or more components;
in response to completing the interaction, receive a receipt associated with the interaction from the third party entity device; and
integrate the receipt with a financial institution application associated with the resource pool of the user.

2. The system of claim 1, wherein the one or more processing devices are configured to execute the computer readable code to establish a direct communication link with the one or more components of the automobile.

3. The system of claim 1, wherein the one or more processing devices are configured to execute the computer readable code to establish a communication link with a smart computing device of the user, wherein the smart computing device is connected to the automobile.

4. The system of claim 3, wherein the one or more processing devices are configured to execute the computer readable code to complete the interaction by:
extracting information associated with one or more resource pools stored in the smart computing device of the user; and
transferring the resources in the one or more resource pools to the third party entity device.

5. The system of claim 3, wherein the one or more processing devices are configured to execute the computer readable code to:
in response to receiving the receipt associated with the interaction from the third party entity device, integrating the receipt with the interaction posted into a user application stored in the smart computing device.

6. The system of claim 5, the receipt is received when the current location of the user does not match the location of the third party entity or a location of the third party entity device.

7. The system of claim 1, wherein the one or more processing devices are configured to execute the computer readable code to complete the interaction by transferring the resources to the third party entity device via a card reader located in the automobile.

8. The system of claim 1, wherein the one or more components comprise at least input devices, output devices, positioning system, and other automotive components.

9. The system of claim 1, wherein the one or more processing devices are configured to execute the computer readable code to apply the logic for selecting the first third party entity by:
identifying user preferences associated with the user;
identifying travel time associated with each of the one or more third party entities by communicating with traffic monitoring systems;
identifying one or more supplemental resources associated with resource pools of the user;
identifying one or more bids received from the identified one or more third party entities; and
determining the first third party entity based on at least the user preferences, the travel time, the one or more supplemental resources, and the one or more bids.

10. The system of claim 1, wherein the fuel is at least one of gas, diesel, or electric.

11. The system of claim 1, wherein the maximum distance is based on fuel consumption of the automobile.

12. The system of claim 1, wherein transferring the location of the third party entity to the user further comprises adding the location of the third party entity to a navigation system of the automobile.

13. A computer program product for communicable integration of an automobile system and a fuel station system, the computer program product comprising at least one non-transitory computer-readable medium having computer-readable program code portions embodied therein, the computer-readable program code portions comprises one or more executable portions for:
receiving an input from a user, via one or more components of an automobile, to search for one or more third party entities distributing fuel;
identifying a location of the user, via the one or more components of the automobile;
calculating a first limit based on the location of the user, wherein the first limit is associated with a maximum distance from the location of the user that the user can travel without running out of fuel;
identifying the one or more third party entities located within the first limit;
applying logic to select a third party entity from the one or more third party entities;
transferring a location of the third party entity to the user, via the one or more components;
continuously identifying a current location of the user via the one or more components;
determining that the current location of the user matches the location of the third party entity;
establishing a first communication link between the automobile and a third party entity device associated with the third party entity;
identifying a trigger from the third party entity device, wherein the trigger is associated with transfer of resources to complete an interaction, wherein the interaction is associated with the distribution of fuel;
in response to identifying the trigger, automatically initiating the transfer of the resources from a resource pool associated with the user, to complete the interaction with the third party entity device;
completing the interaction by transferring the resources to the third party entity device via the one or more components;
in response to completing the interaction, receiving a receipt associated with the interaction from the third party entity device; and
integrating the receipt with a financial institution application associated with the resource pool of the user.

14. The computer program product of claim 13, wherein the computer-readable program code portions comprises one or more executable portions for establishing a direct communication link with the one or more components of the automobile.

15. The computer program product of claim 13, wherein the computer-readable program code portions comprises one or more executable portions for establishing a communication link with a smart computing device of the user, wherein the smart computing device is connected to the automobile.

16. The computer program product of claim 13, wherein the computer-readable program code portions comprises one or more executable portions for transferring the location of the third party entity to the user further comprises adding the location of the third party entity to a navigation system of the automobile.

17. A computer implemented method for communicable integration of an automobile system and a fuel station system, the method comprising:
   receiving an input from a user, via one or more components of an automobile, to search for one or more third party entities distributing fuel;
   identifying a location of the user, via the one or more components of the automobile;
   calculating a first limit based on the location of the user, wherein the first limit is associated with a maximum distance from the location of the user that the user can travel without running out of fuel;
   identifying the one or more third party entities located within the first limit;
   applying logic to select a third party entity from the one or more third party entities;
   transferring a location of the third party entity to the user, via the one or more components;
   continuously identifying a current location of the user via the one or more components;
   determining that the current location of the user matches the location of the third party entity;
   establishing a first communication link between the automobile and a third party entity device associated with the third party entity;
   identifying a trigger from the third party entity device, wherein the trigger is associated with transfer of resources to complete an interaction, wherein the interaction is associated with the distribution of fuel;
   in response to identifying the trigger, automatically initiating the transfer of the resources from a resource pool associated with the user, to complete the interaction with the third party entity device;
   completing the interaction by transferring the resources to the third party entity device via the one or more components;
   in response to completing the interaction, receiving a receipt associated with the interaction from the third party entity device; and
   integrating the receipt with a financial institution application associated with the resource pool of the user.

18. The computer implemented method of claim 17, wherein the method comprises establishing a direct communication link with the one or more components of the automobile.

19. The computer implemented method of claim 17, wherein the method comprises establishing a communication link with a smart computing device of the user, wherein the smart computing device is connected to the automobile.

20. The computer implemented method of claim 17, wherein the method comprises transferring the location of the third party entity to the user by adding the location of the third party entity to a navigation system of the automobile.

* * * * *